US012284476B2

(12) United States Patent
Lamberg et al.

(10) Patent No.: US 12,284,476 B2
(45) Date of Patent: Apr. 22, 2025

(54) SOUND REPRODUCING APPARATUS AND METHOD

(71) Applicant: AAC Technologies Pte. Ltd., Singapore (SG)

(72) Inventors: Timo Lamberg, Tampere (FI); Juha Backman, Tampere (FI)

(73) Assignee: AAC Technologies Pte. Ltd., Singapore (SG)

( * ) Notice: Subject to any disclaimer, the term of this patent is extended or adjusted under 35 U.S.C. 154(b) by 218 days.

(21) Appl. No.: 18/093,827

(22) Filed: Jan. 6, 2023

(65) Prior Publication Data

US 2024/0236550 A1 Jul. 11, 2024

(51) Int. Cl.

*H04R 1/24* (2006.01)
*H04R 1/10* (2006.01)
*H04R 3/04* (2006.01)
*H04R 3/14* (2006.01)

(52) U.S. Cl.

CPC ............ *H04R 1/24* (2013.01); *H04R 1/1008* (2013.01); *H04R 1/1041* (2013.01); *H04R 1/1075* (2013.01); *H04R 3/04* (2013.01); *H04R 3/14* (2013.01); *H04R 2460/13* (2013.01)

(58) Field of Classification Search

None
See application file for complete search history.

(56) References Cited

U.S. PATENT DOCUMENTS

2013/0051585 A1* 2/2013 Karkkainen ......... H04R 1/1075 381/151

* cited by examiner

*Primary Examiner* — Kenny H Truong
(74) *Attorney, Agent, or Firm* — Wiersch Law Group

(57) ABSTRACT

A sound reproducing apparatus is disclosed. The sound reproducing apparatus includes a signal processing unit, a first transducer, and a second transducer. The signal processing unit is configured to receive a sound signal and divide the sound signal into a first frequency component and a second frequency component. The first frequency component is at least partially different from the second frequency component, and the signal processing unit includes a delay unit configured to delay the second frequency band component. The first transducer is configured to convert the first frequency component from the signal processing unit into airborne sound. The second transducer is configured to convert the second frequency component from the delay unit into bone conduction sound.

18 Claims, 8 Drawing Sheets

Sound reproducing apparatus 100

Sound reproducing apparatus 100

SOUND REPRODUCING APPARATUS AND METHOD

TECHNICAL FIELD

Embodiments of the present disclosure relate in general to sound reproducing technology, and more particularly to a sound reproducing apparatus and a sound reproducing method applied at the sound reproducing apparatus.

BACKGROUND OF THE INVENTION

In many headphone applications, especially in virtual and augmented reality applications, it is sometimes desirable to produce sound to the user's ears so that both the reproduced sound and the external sounds (e.g., in a work environment) are heard, but the reproduced sound is not strongly audible to other people near the user. This is often achieved by the use of bone conduction headsets that create vibration in the skull bones of the user, and these vibrations are then transmitted through the head tissues to the inner ear. The actuators (usually only one per channel) are placed on the head in a location where the skin is thin, either close behind the ear (the most common location), or in front of the ear. This arrangement produces an audio signal that is for all practical purposes audible only to the wearer of the headset, and the external sounds can enter the ear freely.

However, the frequency response related shortcomings of bone conduction are also well known in the industry.

SUMMARY OF THE INVENTION

Some embodiments of the present disclosure provide a sound reproducing apparatus, which combines low-frequency privacy of bone conduction headphones and stereo imaging capabilities and extended and stable high frequency response of conventional headphones while maintaining an open ear structure.

Some embodiments of the present disclosure provide a sound reproducing apparatus including: a signal processing unit, configured to receive a sound signal and divide the sound signal into a first frequency component and a second frequency component; where the first frequency component is at least partially different from the second frequency component, and the signal processing unit includes a delay unit configured to delay the second frequency band component; a first transducer, configured to convert the first frequency component from the signal processing unit into airborne sound: and a second transducer, configured to convert the second frequency component from the delay unit into bone conduction sound.

In some embodiments, the signal processing unit further includes a first filter, configured to perform filtering processing on the sound signal to output the first frequency component to the first transducer: and a second filter, configured to perform filtering processing on the sound signal to output the second frequency component to the delay unit.

In some embodiments, the sound reproducing apparatus further includes a first amplifier, configured to amplify the first frequency component from the first filter to output an amplified first frequency component to the first transducer: and a second amplifier, configured to amplify the second frequency component from the delay unit to output an amplified second frequency component to the second transducer.

In some embodiments, the first frequency component includes a high-frequency band of the sound signal, and the second frequency component includes a low-frequency band of the sound signal.

In some embodiments, the sound reproducing apparatus further includes a driver unit including the first transducer and the second transducer: and a supporting unit configured to support the driver unit.

In some embodiments, the supporting unit supports the driver unit such that, when the sound reproducing apparatus is worn on a head of a user, the first transducer is placed close to and spaced apart from an ear canal entrance of the user.

In some embodiments, the driver unit further includes an output port attached to the first transducer, and the supporting unit supports the driver unit such that, when the sound reproducing apparatus is worn on a head of a user, the output port is placed close to and spaced apart from an ear canal entrance of the user.

In some embodiments, the supporting unit supports the driver unit such that, when the sound reproducing apparatus is worn on a head of a user, the second transducer is pressed on the head of the user at a place in front of or behind an ear of the user to contact with the head of the user.

In some embodiments, a time range for the delay is from 2 ms to 100 ms.

In some embodiments, a crossover frequency between the high-frequency band and the low-frequency band is from 500 Hz to 2000 Hz.

Some embodiments of the present disclosure further provide a sound reproducing method, applied at a sound reproducing apparatus, including: a signal processing unit including a delay unit, a first transducer, and a second transducer. The method includes: with the signal processing unit, receiving a sound signal and dividing the sound signal into a first frequency component and a second frequency component, wherein the first frequency component is at least partially different from the second frequency component: with the delay unit, delaying the second frequency band component: with the first transducer, converting the first frequency component from the signal processing unit into airborne sound: and with a second transducer, converting the second frequency component from the delay unit into bone conduction sound.

In some embodiments, the signal processing unit further includes a first filter and a second filter. The method further includes: with the first filter, performing filtering processing on the sound signal to output the first frequency component to the first transducer: and with the second filter, performing filtering processing on the sound signal to output the second frequency component to the delay unit.

In some embodiments, the sound reproducing apparatus further includes a first amplifier and a second amplifier. The method further includes: with the first amplifier, amplifying the first frequency component from the first filter to output an amplified first frequency component to the first transducer; and with the second amplifier, amplifying the second frequency component from the delay unit to output an amplified second frequency component to the second transducer.

In some embodiments, the first frequency component includes a high-frequency band of the sound signal, and the second frequency component includes a low-frequency band of the sound signal.

In some embodiments, the sound reproducing apparatus further includes a driver unit including the first transducer and the second transducer, and a supporting unit configured to support the driver unit.

In some embodiments, the supporting unit supports the driver unit such that, when the sound reproducing apparatus is worn on a head of a user, the first transducer is placed close to and spaced apart from an ear canal entrance of the user.

In some embodiments, the driver unit further includes an output port attached to the first transducer, and the supporting unit supports the driver unit such that, when the sound reproducing apparatus is worn on a head of a user, the output port is placed close to and spaced apart from an ear canal entrance of the user.

In some embodiments, the supporting unit supports the driver unit such that, when the sound reproducing apparatus is worn on a head of a user, the second transducer is pressed on the head of the user at a place in front of or behind an ear of the user to contact with the head of the user.

In some embodiments, a time range for the delay is from 2 ms to 100 ms.

In some embodiments, a crossover frequency between the high-frequency band and the low-frequency band is from 500 Hz to 2000 Hz.

BRIEF DESCRIPTION OF DRAWINGS

One or more embodiments are described as examples with reference to the corresponding figures in the accompanying drawings, and the examples do not constitute a limitation to the embodiments. The figures in the accompanying drawings do not constitute a proportion limitation unless otherwise stated.

DETAILED DESCRIPTION OF THE INVENTION

As stated above, frequency response related shortcomings of bone conduction are well known in the industry, and there are various proposals to improve the performance.

The general idea of using a bone conduction transducer and a second air transmission transducer is widely used and some of the proposals discuss the division of a sound signal into a low-frequency part connected to a bone conduction unit and a high-frequency part connected to an air conduction unit.

However, the bone conduction headsets in general are known for poor sound quality. The audio bandwidth is limited at low frequencies by displacement limitations of usually applied piezoelectric transducers, and by maximum force that can be comfortably used to press a headset against a user's head. With strong low-frequency signals, the effect on the skin can be perceived unpleasant. At high frequencies, the audio bandwidth is limited by compliance of the skin between the transducers and skull bones, and by transmission losses inside the head. In addition, the stereo image is poor, because a vibration signal travels inside the user's head with a low attenuation, and so channel separation is much lower than in conventional headphones. The frequency response and the sensitivity of the headphone are highly dependent on the location of the contact point, tissue properties, and the applied contact point, so the response variability between users and usage times is higher than with conventional headphones. The improvements of the above discussed proposals address the high frequency reproduction problem, but they do not address a problem of poor sound image in stereo reproduction. Bone conduction hearing aids use a structure where a connecting metal part is surgically implanted on the user's skull bone, which greatly improves the vibration transmission and helps with the frequency range of bone conduction, but this kind of approach cannot be considered for non-clinical use, and is likely to make the channel separation problem worse.

In this regard, embodiments of the present disclosure provide a sound reproducing apparatus and a sound reproducing method applied at the sound reproducing apparatus, which combine low-frequency privacy of bone conduction headphones and stereo imaging capabilities and extended and stable high frequency response of conventional headphones while maintaining an open ear structure.

Hereinafter, the embodiments of the present disclosure will be described with reference to the accompanying drawings. In the specification and the accompanying drawings, elements that have substantially the same function and structure are denoted with the same reference signs, and repeated explanation is omitted.

Figure 1:
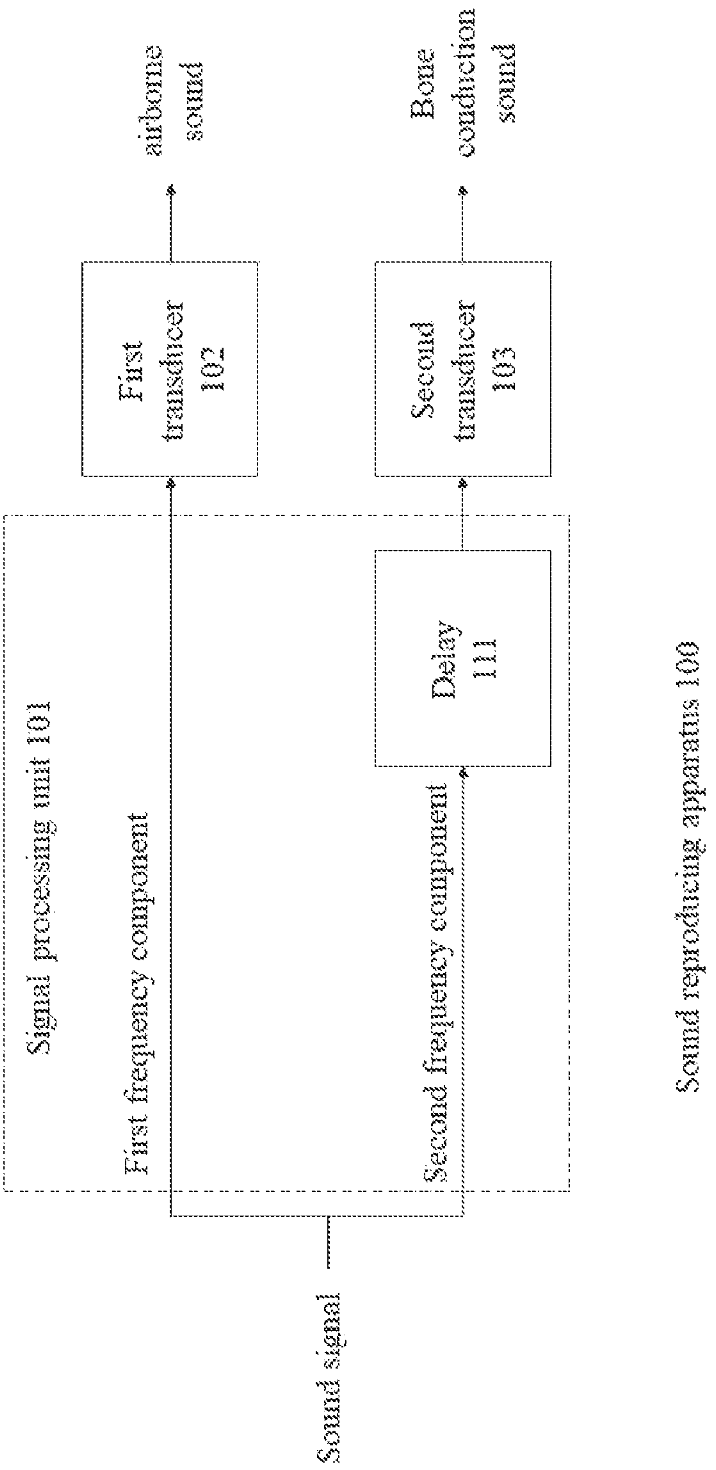
FIG. 1 is schematic diagram showing a functional configuration of a sound reproducing apparatus according to some embodiments of the present disclosure.

FIG. 1 is schematic diagram showing a functional configuration of a sound reproducing apparatus according to some embodiments of the present disclosure. Referring to FIG. 1, the sound reproducing apparatus 100 includes a signal processing unit 101, a first transducer 102, and a second transducer 103.

The signal processing unit 101 is configured to receive a sound signal and divide the sound signal into a first frequency component and a second frequency component. The first frequency component is at least partially different from the second frequency component, and the signal processing unit includes a delay unit 111 configured to delay the second frequency band component.

The first transducer 102 is configured to convert the first frequency component from the signal processing unit 101 into airborne sound.

The second transducer 103 is configured to convert the second frequency component from the delay unit 111 into bone conduction sound.

In some embodiments, the sound signal comes from a sound source output from external audio devices. The sound source may be, for example, sound reproduced by a portable music player or a music APP in a mobile phone, telephone sound from the mobile phone, or the like.

In some embodiments, the sound signal comes from a sound source output from devices built in the hearing system, such as various kinds of wireless headphones (mainly Bluetooth (registered trademark)), headphones with built-in media players able to contain a built-in mass memory and/or a memory card reader, and augmented reality applications where input from a microphone built in an AR/VR system is able to be used to create sound.

The sound reproducing apparatus 100 may be connected to devices providing the sound source in a wired manner or a wireless manner. For example, the sound reproducing apparatus 100 receives an acoustic electric signal from devices (not shown) such as a portable music player and a mobile phone via a wired cable or wireless communication such as Bluetooth (registered trademark).

The airborne sound is a sound that is able to directly reaches ears of human in the air. The bone conduction sound is a sound that reaches the ears of human through the tissues and the inside of the human body.

In some embodiments, the first transducer 102 may be any of air conduction loudspeakers or earpieces capable of reproducing the air conduction sound. For example, the first transducer 102 may be dynamic, piezoelectric, electromagnetic of asymmetrical or balanced armature type, electrostatic, or MEMS type piezoelectric or electrostatic transducer. The dynamic (and in some cases, electrostatic) principles are preferred implementations when the first transducer 102 is outside an ear of a user, while all of these transduction principles have been applied for in-ear devices. Because a reproduction range of any of these transducers is limited to high frequencies, all of these transducers may also be used in systems where the first transducer 102 is partially inserted in the ear (ear canal, concha, etc.) but not fully blocking the ear canal.

In some embodiments, the second transducer 103 may be any of bone conduction actuators capable of reproducing the bone conduction sound. For example, the second transducer 103 may be piezoelectric, dynamic, or electromagnetic actuators.

In some embodiments, the first frequency component is a high-frequency band of the sound signal, and the second frequency component is a low-frequency band of the sound signal. The high-frequency band of the sound signal is at least partially different from the low-frequency band of the sound signal.

A crossover frequency between the high-frequency band and the low-frequency band depends on properties of the first transducer 102 and the second transducer 103. In some embodiments, a crossover frequency between the high-frequency band and the low-frequency band is from 500 Hz to 2000 Hz, for example, may be 600 Hz, 850 Hz, 910 Hz, 1050 Hz, 1140 Hz, 1190 Hz, etc.

In some embodiments, a time range for the delay is from 2 ms to 100 ms. If virtual bass enhancement is used in the sound reproducing apparatus 100, the low-frequency band of the sound signal is able to be reduced while impression of low-frequency is retained. A recommended range for delay is from about 2 ms to below about 50-100 ms. The 2 ms is the minimum threshold for strong precedence effect, below which the effect gets weaker. If the time for the delay is above 100 ms, the delayed sound may be perceived as an echo. The precise amount of delay depends on acoustical implementation details. In one example, the implementation of the delay unit 111 may be digital. In another example, the implementation of the delay unit 111 may be analog delay lines.

As an implementation, the high-frequency air conduction loudspeaker receives the high-frequency band of the sound signal to generate the airborne sound, and the airborne sound directly reaches the ear of the user through the air. The low-frequency bone conduction actuator receives a delayed low-frequency band of the sound signal to generate the bone conduction sound, and the bone conduction sound is transmitted to the user's hearing system through the tissues and the inside of the user' body. In this way, the sound reproducing apparatus transmits both forms of energies to the user so as to provide a combined audio delivery to the user. Since the delay unit 111 incorporated in the signal processing unit 101 delays the low-frequency band going to the low-frequency bone conduction actuator, the user's hearing system is able to localize the sound in a stereophonic signal primarily based on the high-frequency component transmitted as airborne sound, which improves sound localization.

Figure 2:
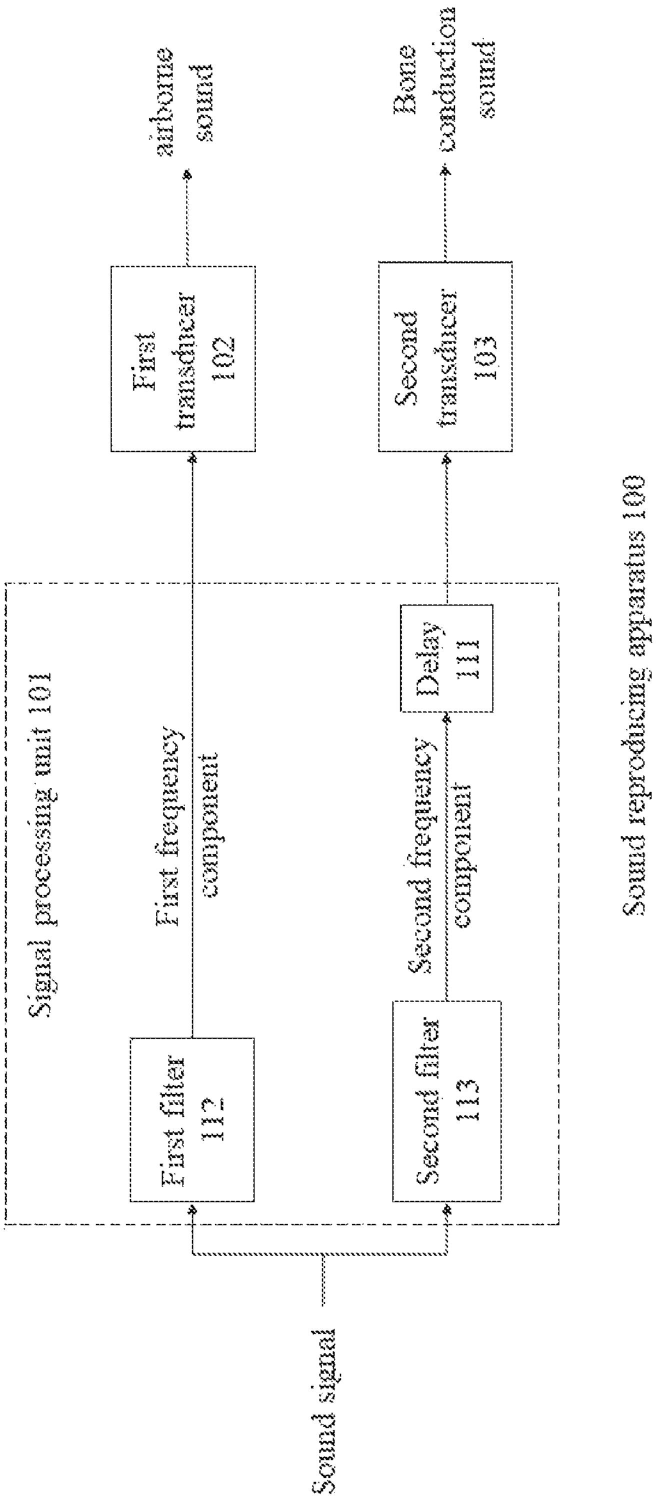
FIG. 2 is another schematic diagram showing a functional configuration of a sound reproducing apparatus according to some embodiments of the present disclosure.

FIG. 2 is another schematic diagram showing a functional configuration of a sound reproducing apparatus according to some embodiments of the present disclosure. As shown in FIG. 2, the signal processing unit 101 further includes a first filter 112 and a second filter 113.

The first filter 112 is configured to perform filtering processing on the sound signal to output the first frequency component to the first transducer 102.

The second filter 113 is configured to perform filtering processing on the sound signal to output the second frequency component to the delay unit 111.

In some embodiments, the first filter 112 is a high-pass filter. The high-pass filter receives the sound signal and passes through the high-frequency band of the sound signal, i.e., the high-frequency component facilitating the conversion of the first transducer 102 (e.g., a high-frequency loudspeaker) into airborne sound. In other words, the high-pass filter 112 filters out the low-frequency component that the high-frequency loudspeaker cannot reproduce with high sound quality.

In some embodiments, the second filter 113 is a low-pass filter. The low-pass filter receives the sound signal and passes through the low-frequency band of the sound signal, i.e., the low-frequency component facilitating the conversion of the second transducer 103 (e.g., a low-frequency actuator) into bone conduction sound. It is known the bone conduction sound has a characteristic that the high-frequency component attenuates when propagating soft tissues with low eigenfrequency, such as muscle and cartilage. For these reasons, it can be said that the high-frequency component is difficult to be reproduced as the bone conduction sound. Thus, the low-pass filter 113 is configured to filter out the high-frequency component that the low-frequency actuator cannot reproduce with high sound quality.

In some embodiments, the first filter 112 and the second filter 113 may be replaced with a first equalizer and a second equalizer (none are shown), respectively. The first equalizer performs equalizing processing on the sound signal for the first transducer 102, and the second equalizer performs equalizing processing on the sound signal for the second transducer 103. The first equalizer performs equalizing processing so as to remove components over a low-frequency range that can be conveyed by the first transducer 102. In this way, it is possible for the first transducer 102 to output the airborne sound with good sound quality. The second equalizer performs equalizing processing so as to remove unnecessary resonance noise components generated in a high-frequency range. In this way, it is possible for the second transducer 103 to output the bone conduction sound with good sound quality.

In some embodiments, the signal processing unit 101 may be analog or digital, and may further includes additional functionality, such as equalization, dynamic range processing, transducer protection, virtual bass processing, background noise dependent adjustments, compensation for the individual hearing profile, etc.

Figure 3:
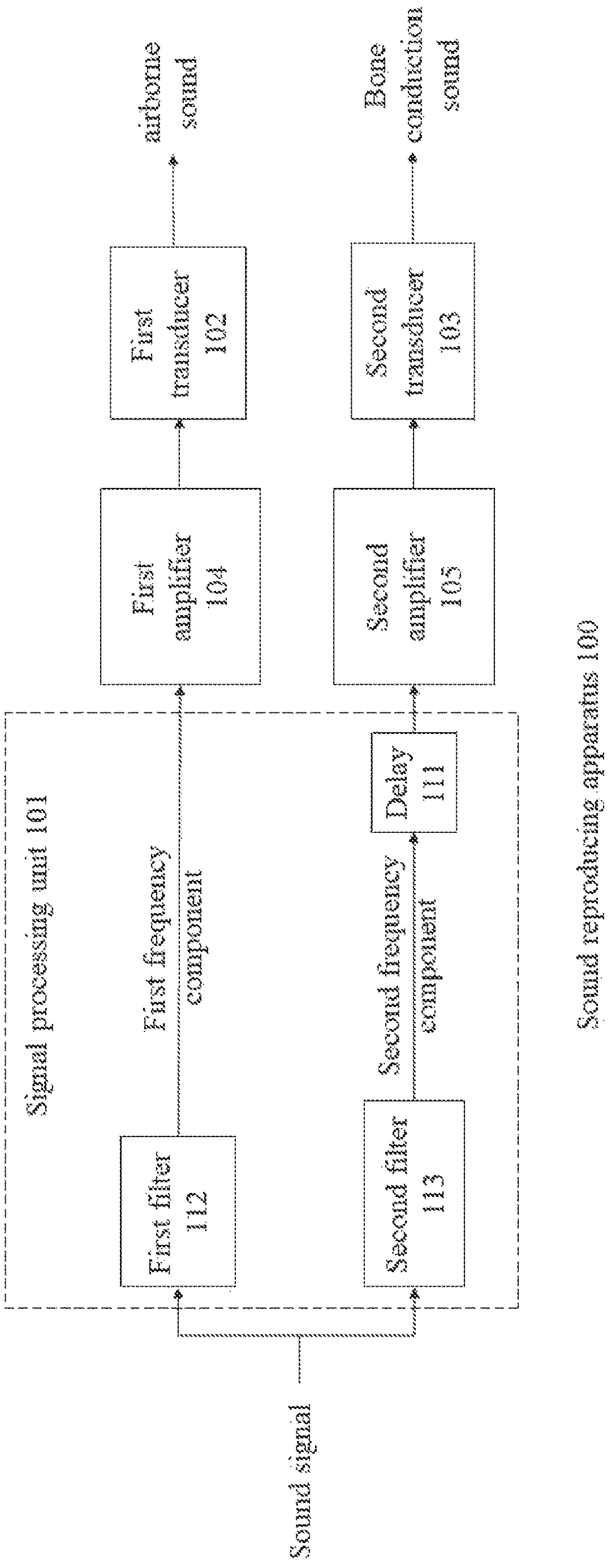
FIG. 3 is still another schematic diagram showing a functional configuration of a sound reproducing apparatus according to some embodiments of the present disclosure.

In some embodiments, as shown in FIG. 3, the sound reproducing apparatus 100 may further includes a first amplifier 104 and a second amplifier 105. The first amplifier 104 is configured to amplify the first frequency component from the first filter 112 to output an amplified first frequency component to the first transducer 102. The second amplifier 105 is configured to amplify the second frequency component from the delay unit 111 to output an amplified second frequency component to the second transducer 103.

The first amplifier 104 and the second amplifier 105 may be variable gain amplifiers to adjust the sound volumes of the low- and high-frequency component of the sound signal. By controlling the gain of each of the variable gain amplifiers 104 and 105, the waveform equalization characteristics with the suppressed low-frequency component are obtained, and the sound volume of the high-frequency component is increased. On the contrary, the waveform equalization characteristics with the suppressed high-frequency component are obtained, and the sound volume of the low-frequency component is increased.

Figure 4:
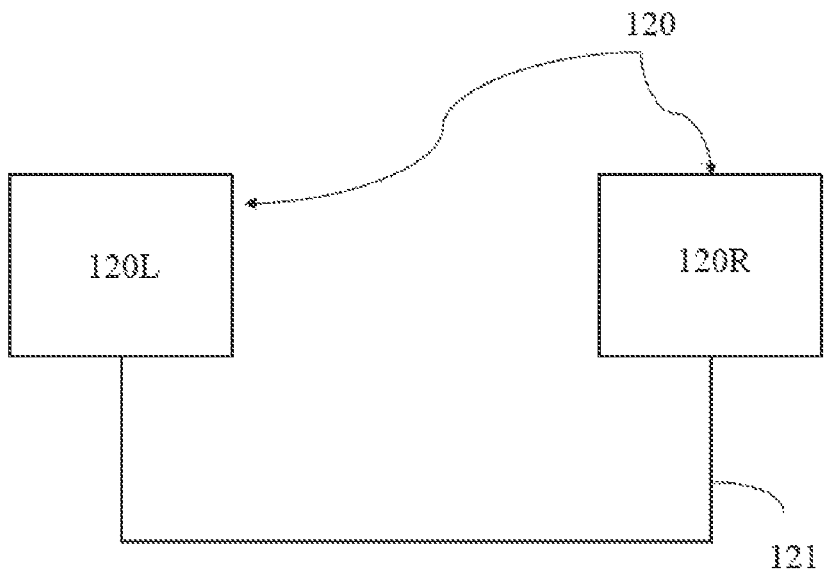
FIG. 4 is a simplified structural diagram of a sound reproducing apparatus according to some embodiments of the present disclosure.

FIG. 4 is a simplified structural diagram of a sound reproducing apparatus according to some embodiments of the present disclosure. The sound reproducing apparatus 100 may include at least one driver unit 120 (i.e., a left driver unit 120L and a right driver unit 120R), and a supporting unit 121 configured to support the left and right driver units 120L and 120R. Each of the left and right driver units 120L and 120R includes at least the first transducer 102 and the second transducer 102 described in the above embodiments. The supporting unit 121 supports the left and right driver units 120L and 120R at both ends and has a substantially bilateral symmetrical structure.

Note that it is not indispensable the exterior of the entire sound reproducing apparatus 100 including the supporting unit 102 has a bilateral symmetrical structure. And also, note that it is not indispensable for the sound reproducing apparatus 100 to be equipped with the left and right driver units 120L and 120R on both the left and right sides, and only one of the left and right sides is equipped with the driver unit 120L or 120R is also assumed.

In some embodiments, the supporting unit 121 may be a headband of a conventional headphone, or arms or headband of a virtual or augmented reality headset.

As an example, the supporting unit 121 is a headband, the supporting unit 121 is configured such that it is wound around from the back portion of the head to the neck portion of the user to be used. In one example, the supporting unit 121 is also configured to be wound around through the top portion of the head.

In this regard, the supporting unit 121 is a U-shaped structure body which has moderate elasticity and includes, for example, a synthetic resin such as polypropylene, or a metal such as aluminum, stainless steel, or titanium. The supporting unit 121 is able to be wound around from the back portion of the head to the neck portion of the user so as to sandwich the head by widening the U-shape. At this time, a resilience for going back to the original U-shape occurs in the supporting unit 121. This resilience acts on both ends of the supporting unit 121 toward the inner side of the head of the user, thereby pressing the left and right driver units 120L and 120R against the vicinities of the left and right ears, respectively.

As an example, the supporting unit 121 is the arm of a virtual or augmented reality headset e.g. a glass with sound reproducing function. The supporting unit 121 is configured such that the driver units 120L and 120R are supported by the ears of the user.

Figure 5:
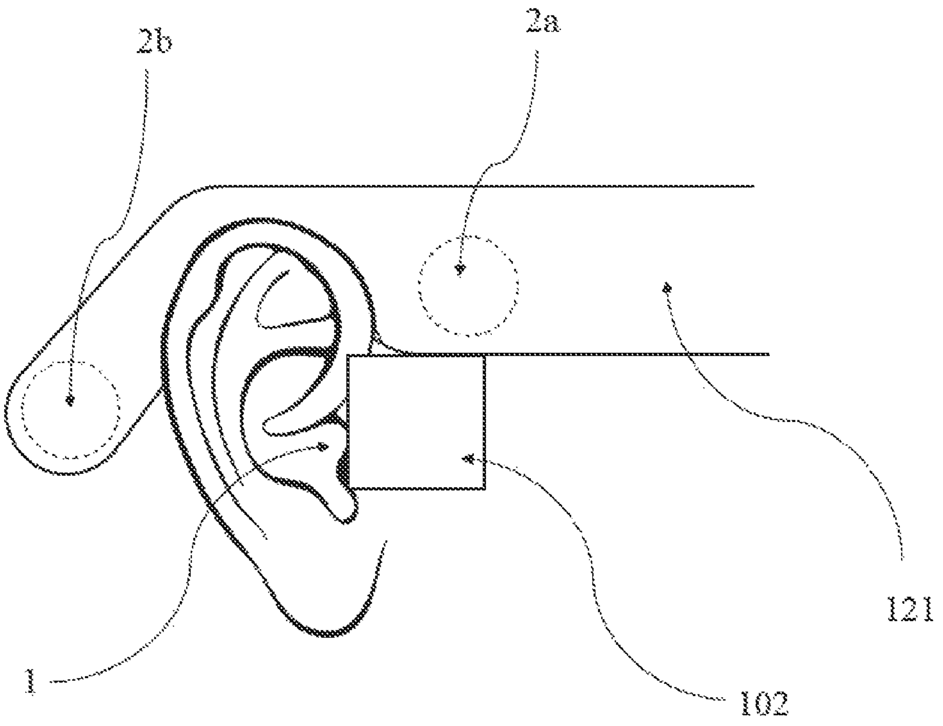
FIG. 5 is an explanatory local diagram showing a sound reproducing apparatus when worn by a user and viewed from the right of the user.
Figure 6:
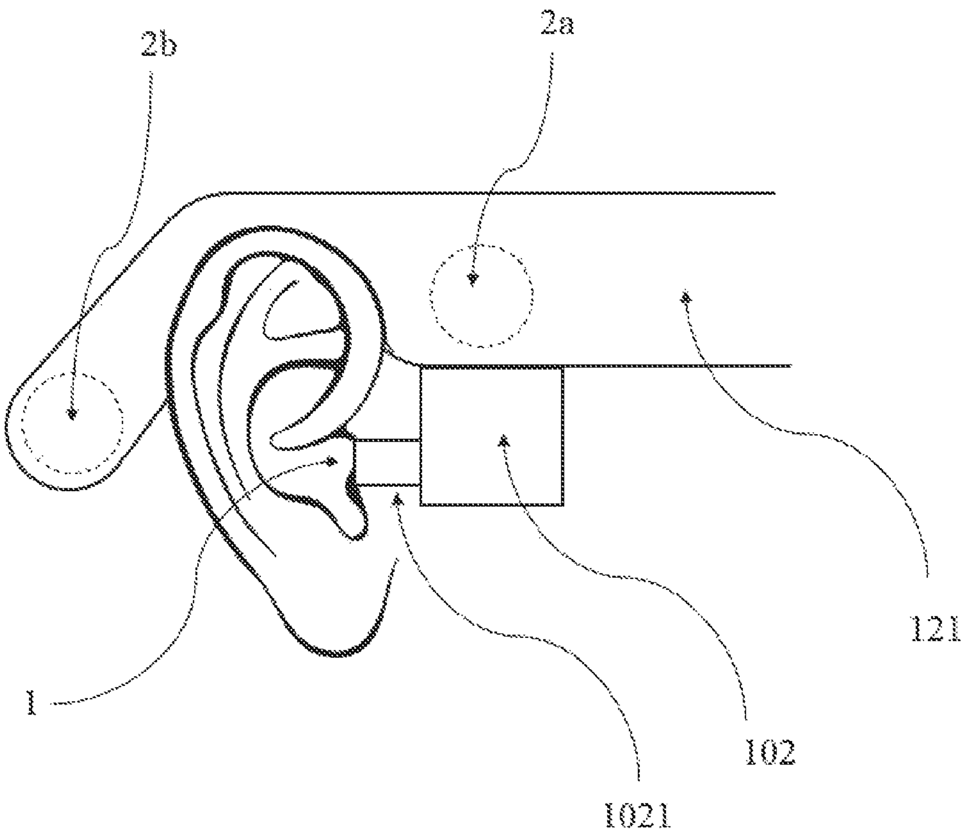
FIG. 6 is another explanatory local diagram showing a sound reproducing apparatus when worn by a user and viewed from the right of the user.
Figure 7:
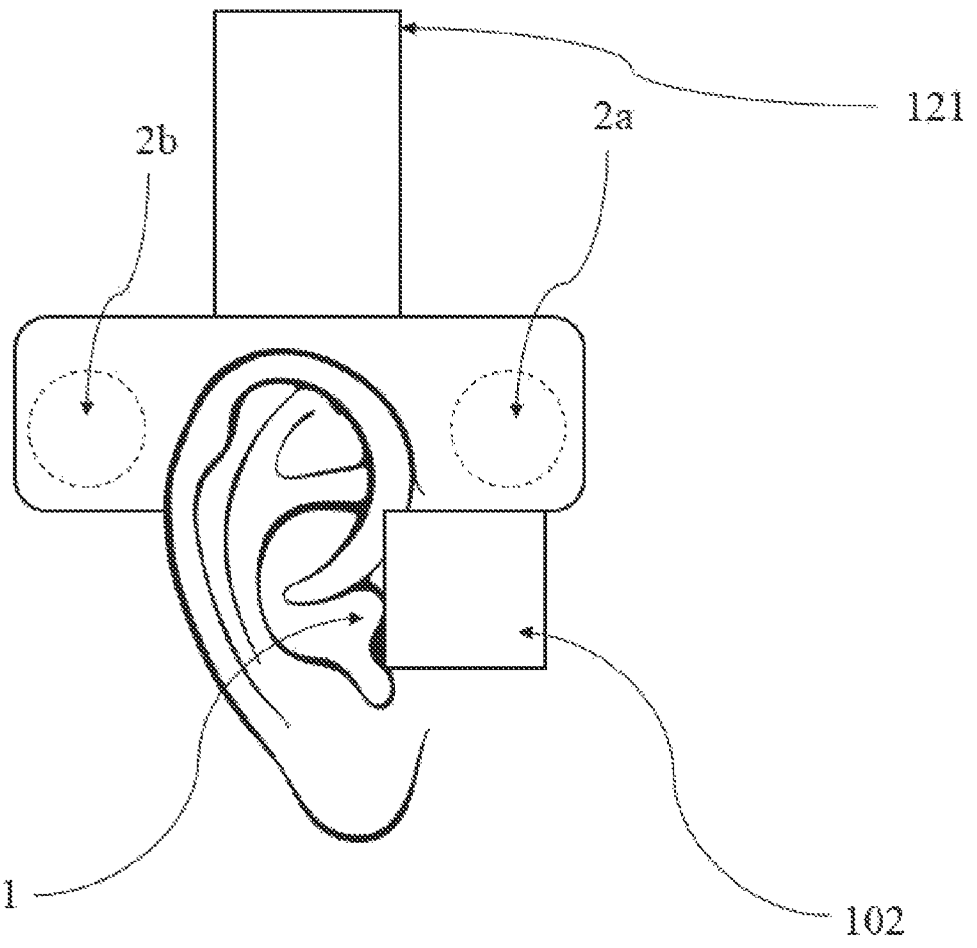
FIG. 7 is still another explanatory local diagram showing a sound reproducing apparatus when worn by a user and viewed from the right of the user.

FIGS. 4-6 are three explanatory local diagrams showing the sound reproducing apparatus 100 when worn by a user and viewed from the right of the user.

Referring to FIG. 4 and FIG. 5, as an example, the sound reproducing apparatus 100 is a virtual or augmented reality headset e.g., a glass with sound reproducing function, and the supporting unit 121 is the arm of glass. The driver unit 120R includes the first transducer 102 and the second transducer 103. The supporting unit 121 is configured to support the driver unit 120R on the head of the user.

In some embodiments, as shown in FIG. 4, the supporting unit 121 supports the driver unit 120R such that, when the sound reproducing apparatus 100 is worn on the head of the user, the first transducer 102 is placed close to and spaced apart from an ear canal entrance 1 of the user. The supporting unit 121 supports the driver unit 120R such that, when the sound reproducing apparatus 100 is worn on the head of the user, the second transducer 103 is pressed on the head of the user at a place 2*a* in front of the ear or at a place 2*b* behind the ear to contact with the head of the user.

In some embodiments, as shown in FIG. 5, the driver unit 120R further includes an output port 1021 attached to the first transducer 102, and the supporting unit 121 supports the driver unit 120R such that, when the sound reproducing apparatus 100 is worn on a head of a user, the output port 1021 is placed close to and spaced apart from the ear canal entrance 1 of the user. The supporting unit 121 supports the driver unit 120R such that, when the sound reproducing apparatus 100 is worn on the head of the user, the second transducer 103 is pressed on the head of the user at the place 2*a* in front of the ear or at the place 2*b* behind the ear to contact with the head of the user.

Referring to FIG. 6, as an example, the sound reproducing apparatus 100 is a conventional headphone or headset including a mounting assembly (i.e., the driver unit 120R) for the first transducer 102 and the second transducer 103 and a headband for connecting the first transducer 102 and the second transducer 103.

In some embodiments, as shown in FIG. 6, the supporting unit 121 supports the driver unit 120R such that, when the sound reproducing apparatus 100 is worn on the head of the user, the first transducer 102 is placed close to and spaced apart from an ear canal entrance 1 of the user. The supporting unit 121 supports the driver unit 120R such that, when the sound reproducing apparatus 100 is worn on the head of the user, the second transducer 103 is pressed on the head of the user at a place 2*a* in front of the ear or at a place 2*b* behind the ear to contact with the head of the user.

From the above, it is seen when the sound reproducing apparatus 100 is worn on the head of the user, the sound reproducing apparatus 100 does not substantially obstruct the ear or block the ear canal entrance 1 of the user. In other words, the sound reproducing apparatus 100 in the present disclosure can be said to be an ear-hole open structure.

The sound reproducing apparatus 100 in the embodiments of the present disclosure provides a new headphone or headset structure combines the low-frequency privacy of bone conduction headphones and the stereo imaging capabilities and the extended and stable high frequency response of conventional headphones while maintaining the ear-hole open structure.

Figure 8:
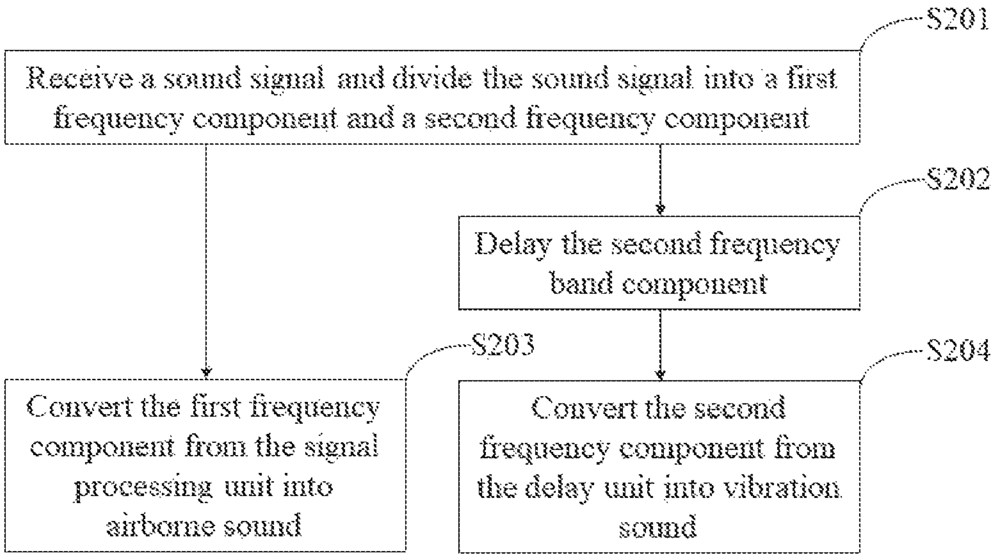
FIG. 8 is a flowchart of a sound reproducing method according to some embodiments of the present disclosure.

FIG. 8 is a flowchart of a sound reproducing method according to some embodiments of the present disclosure. Some embodiments of the present disclosure further provide a sound reproducing method applied at the sound reproducing apparatus 100 described in the above embodiments.

The sound reproducing apparatus 100 includes a signal processing unit 101 including a delay unit 111, a first transducer 102, and a second transducer 103. The sound reproducing method includes: with the signal processing unit 101, receiving (S101) a sound signal and dividing the sound signal into a first frequency component and a second frequency component; with the delay unit 111, delaying (S102) the second frequency band component: with the first transducer 102, converting (S103) the first frequency component from the signal processing unit into airborne sound: and with a second transducer 103, converting (S104) the second frequency component from the delay unit into bone conduction sound. The first frequency component is at least partially different from the second frequency component.

In some embodiments, the signal processing unit 101 further includes a first filter 112 and a second filter 113. The method further includes: with the first filter 112, performing filtering processing on the sound signal to output the first frequency component to the first transducer: and with the second filter 113, performing filtering processing on the sound signal to output the second frequency component to the delay unit.

In some embodiments, the sound reproducing apparatus 100 further includes a first amplifier 104 and a second amplifier 105. The method further includes: with the first amplifier 104, amplifying the first frequency component from the first filter to output an amplified first frequency component to the first transducer 102: and with the second amplifier 105, amplifying the second frequency component from the delay unit 111 to output an amplified second frequency component to the second transducer 103.

In some embodiments, the first frequency component includes a high-frequency band of the sound signal, and the second frequency component includes a low-frequency band of the sound signal.

In some embodiments, the sound reproducing apparatus 100 further includes a driver unit 120 including the first transducer 102 and the second transducer 103, and a supporting unit 121 configured to support the driver unit 120.

In some embodiments, the supporting unit 121 supports the driver unit 120 such that, when the sound reproducing apparatus 100 is worn on a head of a user, the first transducer 102 is placed close to and spaced apart from an ear canal entrance 1 of the user.

In some embodiments, the driver unit 120 further includes an output port 1021 attached to the first transducer 102, and the supporting unit 121 supports the driver unit 120 such that, when the sound reproducing apparatus 100 is worn on a head of a user, the output port 1021 is placed close to and spaced apart from an ear canal entrance 1 of the user.

In some embodiments, the supporting unit 121 supports the driver unit 120 such that, when the sound reproducing apparatus 100 is worn on a head of a user, the second transducer 103 is pressed on the head of the user at a place in front of or behind an ear of the user to contact with the head of the user.

In some embodiments, a time range for the delay is from 2 ms to 100 ms.

In some embodiments, a crossover frequency between the high-frequency band and the low-frequency band is from 500 Hz to 2000 Hz.

The sound reproducing method in the embodiments of the present disclosure provides an operating method for a new headphone or headset structure combines the low-frequency privacy of bone conduction headphones and the stereo imaging capabilities and the extended and stable high frequency response of conventional headphones while maintaining the ear-hole open structure.

In addition, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

The above embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present disclosure are merely illustrative and demonstrative, and not limitative. In other words, the technology according to the present disclosure can exhibit other effects that are evident to those skilled in the art along with or instead of the effects based on the present disclosure.

The invention claimed is:

1. A sound reproducing apparatus comprising:

a signal processing unit, configured to receive a sound signal and divide the sound signal into a first frequency component and a second frequency component; wherein the first frequency component is at least partially different from the second frequency component, and the signal processing unit comprises a delay unit configured to delay the second frequency band component;

a first transducer, configured to convert the first frequency component from the signal processing unit into airborne sound; and a second transducer, configured to convert the second frequency component from the delay unit into bone conduction sound, wherein a time range for the delay is from 2 ms to 100 ms.

2. The sound reproducing apparatus according to claim 1, wherein the signal processing unit further comprises:

a first filter, configured to perform filtering processing on the sound signal to output the first frequency component to the first transducer; and a second filter, configured to perform filtering processing on the sound signal to output the second frequency component to the delay unit.

3. The sound reproducing apparatus according to claim 2, further comprising:

a first amplifier, configured to amplify the first frequency component from the first filter to output an amplified first frequency component to the first transducer; and a second amplifier, configured to amplify the second frequency component from the delay unit to output an amplified second frequency component to the second transducer.

4. The sound reproducing apparatus according to claim 1, wherein the first frequency component comprises a high-frequency band of the sound signal, and the second frequency component comprises a low-frequency band of the sound signal.

5. The sound reproducing apparatus according to claim 4, wherein a crossover frequency between the high-frequency band and the low-frequency band is from 500 Hz to 2000 Hz.

6. The sound reproducing apparatus according to claim 1, further comprising:
- a driver unit including the first transducer and the second transducer; and
- a supporting unit configured to support the driver unit.

7. The sound reproducing apparatus according to claim 6, wherein the supporting unit supports the driver unit such that, when the sound reproducing apparatus is worn on a head of a user, the first transducer is placed close to and spaced apart from an ear canal entrance of the user.

8. The sound reproducing apparatus according to claim 6, wherein the driver unit further comprises an output port attached to the first transducer, and the supporting unit supports the driver unit such that, when the sound reproducing apparatus is worn on a head of a user, the output port is placed close to and spaced apart from an ear canal entrance of the user.

9. The sound reproducing apparatus according to claim 6, wherein the supporting unit supports the driver unit such that, when the sound reproducing apparatus is worn on a head of a user, the second transducer is pressed on the head of the user at a place in front of or behind an ear of the user to contact with the head of the user.

10. A sound reproducing method, applied at a sound reproducing apparatus comprising:
- a signal processing unit comprising a delay unit,
- a first transducer, and
- a second transducer;
- the sound reproducing method comprising:
- with the signal processing unit, receiving a sound signal and dividing the sound signal into a first frequency component and a second frequency component, wherein the first frequency component is at least partially different from the second frequency component;
- with the delay unit, delaying the second frequency band component;
- with the first transducer, converting the first frequency component from the signal processing unit into airborne sound; and
- with a second transducer, converting the second frequency component from the delay unit into bone conduction sound, wherein
- a time range for the delay is from 2 ms to 100 ms.

11. The sound reproducing method according to claim 10, further comprising:
- the signal processing unit further comprising a first filter and a second filter;
- with the first filter, performing filtering processing on the sound signal to output the first frequency component to the first transducer; and
- with the second filter, performing filtering processing on the sound signal to output the second frequency component to the delay unit.

12. The sound reproducing method according to claim 11, further comprising:
- the sound reproducing apparatus further comprising a first amplifier and a second amplifier;
- with the first amplifier, amplifying the first frequency component from the first filter to output an amplified first frequency component to the first transducer; and
- with the second amplifier, amplifying the second frequency component from the delay unit to output an amplified second frequency component to the second transducer.

13. The sound reproducing method according to claim 10, wherein the first frequency component comprises a high-frequency band of the sound signal, and the second frequency component comprises a low-frequency band of the sound signal.

14. The sound reproducing method according to claim 13, wherein a crossover frequency between the high-frequency band and the low-frequency band is from 500 Hz to 2000 Hz.

15. The sound reproducing method according to claim 10, wherein the sound reproducing apparatus further comprises a driver unit including the first transducer and the second transducer, and a supporting unit configured to support the driver unit.

16. The sound reproducing method according to claim 15, wherein the supporting unit supports the driver unit such that, when the sound reproducing apparatus is worn on a head of a user, the first transducer is placed close to and spaced apart from an ear canal entrance of the user.

17. The sound reproducing method according to claim 15, wherein the driver unit further comprises an output port attached to the first transducer, and the supporting unit supports the driver unit such that, when the sound reproducing apparatus is worn on a head of a user, the output port is placed close to and spaced apart from an ear canal entrance of the user.

18. The sound reproducing method according to claim 15, wherein the supporting unit supports the driver unit such that, when the sound reproducing apparatus is worn on a head of a user, the second transducer is pressed on the head of the user at a place in front of or behind an ear of the user to contact with the head of the user.

* * * * *